US010647020B2

(12) United States Patent
Oguchi et al.

(10) Patent No.: US 10,647,020 B2
(45) Date of Patent: May 12, 2020

(54) SHEET MANUFACTURING APPARATUS AND SHEET MANUFACTURING METHOD

(71) Applicant: SEIKO EPSON CORPORATION, Tokyo (JP)

(72) Inventors: Yuki Oguchi, Nagano (JP); Yoshinobu Monbetsu, Nagano (JP); Masahide Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 469 days.

(21) Appl. No.: 15/115,312

(22) PCT Filed: Sep. 26, 2014

(86) PCT No.: PCT/JP2014/004951
§ 371 (c)(1),
(2) Date: Jul. 29, 2016

(87) PCT Pub. No.: WO2015/140847
PCT Pub. Date: Sep. 24, 2015

(65) Prior Publication Data

US 2017/0001330 A1 Jan. 5, 2017

(30) Foreign Application Priority Data

Mar. 20, 2014 (JP) ................................ 2014-057689

(51) Int. Cl.
*B27N 3/00* (2006.01)
*B07B 1/22* (2006.01)
(Continued)

(52) U.S. Cl.
CPC ................ *B27N 3/007* (2013.01); *B07B 1/22* (2013.01); *B07B 9/02* (2013.01); *B07B 13/16* (2013.01);
(Continued)

(58) Field of Classification Search
CPC .................................... B07B 1/22; B07B 9/02
See application file for complete search history.

(56) References Cited

U.S. PATENT DOCUMENTS

| | | | | |
|---|---|---|---|---|
| 2,347,716 A * | 5/1944 | Staege | ..................... D21D 5/18 | 209/2 |
| 3,642,139 A * | 2/1972 | Wilson | ...................... B04B 3/04 | 210/213 |

(Continued)

FOREIGN PATENT DOCUMENTS

| | | |
|---|---|---|
| CN | 1432083 A | 7/2003 |
| CN | 101821070 A | 9/2010 |

(Continued)

OTHER PUBLICATIONS

Zand, M.H., 1983. Microprocessor control of a mechanical pulp refiner. https://search.proquest.com/pqdtglobal/docview/303190097/fulltextPDF/44AOCE121E6481FPQ/2?accountid=14753 (Year: 1983).*

(Continued)

*Primary Examiner* — Leith S Shafi
*Assistant Examiner* — Nicholas R Krasnow
(74) *Attorney, Agent, or Firm* — Global IP Counselors, LLP

(57) ABSTRACT

A sheet manufacturing apparatus that shortens the time until the apparatus stops is provided. The sheet manufacturing apparatus has a sieve unit having at least part of material defibrated in a defibration process introduced thereto, moving at a first speed, and passing defibrated material through multiple openings disposed in the main section thereof; and a forming unit forming a sheet using precipitate that past through the openings of the sieve unit; the sheet manufacturing apparatus stopping the sieve unit with defibrated
(Continued)

material that was introduced stored inside the sieve unit when production by the sheet manufacturing apparatus stops.

4 Claims, 5 Drawing Sheets

(51) Int. Cl.
*B07B 9/02* (2006.01)
*B07B 13/16* (2006.01)
*B07B 13/18* (2006.01)
*B27N 3/04* (2006.01)

(52) U.S. Cl.
CPC ................ *B07B 13/18* (2013.01); *B27N 3/04* (2013.01); *B27N 3/00* (2013.01)

(56) References Cited

U.S. PATENT DOCUMENTS

| | | | | |
|---|---|---|---|---|
| 4,218,414 | A * | 8/1980 | Hagg | B02C 4/00 264/115 |
| 4,455,195 | A * | 6/1984 | Kinsley | B01D 39/18 162/13 |
| 4,640,810 | A * | 2/1987 | Laursen | D04H 1/732 264/121 |
| 6,629,653 | B2 * | 10/2003 | Fahrbach | B02C 13/13 241/24.21 |
| 6,709,613 | B2 | 3/2004 | Chambers, Jr. et al. | |
| 7,597,200 | B2 | 10/2009 | Christensen | |
| 8,882,965 | B2 | 11/2014 | Yamagami et al. | |
| 9,174,243 | B2 | 11/2015 | Nakamura | |
| 9,194,081 | B2 | 11/2015 | Yamagami | |
| 9,435,078 | B2 * | 9/2016 | Yamagami | D21B 1/08 |
| 9,790,642 | B2 * | 10/2017 | Nakamura | B07B 13/00 |
| 9,834,875 | B2 | 12/2017 | Kunze et al. | |
| 2003/0070262 | A1 | 4/2003 | Andersen | |
| 2003/0183570 | A1 * | 10/2003 | Takarabe | B01D 24/007 210/267 |
| 2005/0098910 | A1 | 5/2005 | Andersen | |
| 2008/0264591 | A1 * | 10/2008 | Backstrom | D21G 9/0027 162/202 |
| 2010/0207298 | A1 | 8/2010 | Kunze et al. | |
| 2010/0326892 | A1 | 12/2010 | Hsiau et al. | |
| 2014/0027075 | A1 | 1/2014 | Yamagami et al. | |

FOREIGN PATENT DOCUMENTS

| | | | |
|---|---|---|---|
| CN | 102605664 | A | 7/2012 |
| DE | 2651527 | A | 5/1977 |
| FR | 1187111 | A | 9/1959 |
| GB | 2458977 | A | 10/2009 |
| JP | 11-147209 | A | 6/1999 |
| JP | 2003-520912 | A | 7/2003 |
| JP | 2012-144819 | A | 8/2012 |
| JP | 2013-087368 | A | 5/2013 |
| JP | 2013087368 | A * | 5/2013 |
| JP | 2013-147772 | A | 8/2013 |
| WO | 85/04366 | A1 | 10/1985 |

OTHER PUBLICATIONS

The Extended European Search Report for the corresponding European Patent Application No. 14886133.9 dated Oct. 17, 2017.

* cited by examiner

SHEET MANUFACTURING APPARATUS AND SHEET MANUFACTURING METHOD

TECHNICAL FIELD

The present invention relates to a sheet manufacturing apparatus and a method of manufacturing sheets.

BACKGROUND

Conventional sheet manufacturing apparatuses use a wet process in which feedstock containing fiber is soaked in water, defibrated by primarily mechanical means, and detangled (see, for example, PTL 1). Such wet process sheet manufacturing apparatuses require a large amount of water and the equipment is large. Maintenance of a water treatment facility is also time-consuming, and significant energy is required for a drying process.

Dry-process sheet manufacturing apparatuses requiring minimal water have therefore been proposed to reduce device size and save energy (see, for example, PTL 2). PTL 2 describes defibrating paper shreds to fiber in a dry defibrator, passing the defibrated material (fiber) through a fine screen on the surface of a forming drum, and laying the fiber on a mesh belt to form paper.

CITATION LIST

Patent Literature

[PTL 1] JP-A-2013-87368
[PTL 2] JP-A-2012-144819

SUMMARY OF INVENTION

Technical Problem

PTL 1 describes stopping supplying new paper feedstock to the head box in the idle mode, and going to the idle mode after forming all paper feedstock remaining in the head box into paper. PTL 2 is silent about control for stopping operation, and if the method of PTL 1 is applied to the dry-process sheet manufacturing apparatus described in PTL 2, operation stops after all material in the forming drum has been discharged. This requires time to discharge all material in the forming drum when stopping operation, and requires time until material accumulates in the forming drum and can be stably discharged when starting operation.

Solution to Problem

The invention is directed to solving at least part of the foregoing problem, and can be embodied by the embodiments and examples described below.

A sheet manufacturing apparatus in one aspect of the invention comprises a sieve unit having at least part of material defibrated in a defibration process introduced thereto, moving at a first speed, and passing the defibrated material through multiple openings disposed in the main section thereof; and a forming unit forming a sheet using precipitate that past through the openings of the sieve unit; the sheet manufacturing apparatus stopping the sieve unit with defibrated material that was introduced stored inside the sieve unit.

"With defibrated material stored in the sieve unit" means that defibrated material remains in the sieve unit to the extent that defibrated material inside the sieve unit passes through the openings when the sieve unit is then moved in that state.

The time until the sheet manufacturing apparatus stops can be shortened by the apparatus stopping the sieve unit with defibrated material stored inside the sieve unit. Because the defibrated material stored in the sieve unit passes through the openings if the apparatus is then started from this state, the time until sheet production starts can also be shortened.

In the sheet manufacturing apparatus of the invention, the defibrated material may be stored in the sieve unit by stopping movement of the main section while the defibrated material is being introduced to the sieve unit.

Because defibrated material is introduced to the sieve unit when movement of the main section is stopped in this sheet manufacturing apparatus, the sieve unit can be easily stopped with defibrated material stored therein.

In the sheet manufacturing apparatus of the invention, the defibrated material may be stored in the sieve unit by moving the main section at a lower speed than the first speed while the defibrated material is being introduced to the sieve unit.

By setting the speed of main section movement lower than the first speed while defibrated material is being introduced to the sieve unit in this sheet manufacturing apparatus, defibrated material can be stored inside the sieve unit because defibrated material is introduced to the sieve unit while the amount of defibrated material passing through the openings decreases.

In the sheet manufacturing apparatus of the invention, the main section may move at a higher speed than the first speed while the defibrated material is being introduced to the sieve unit, movement of the main section stopping once the defibrated material is stored in the sieve unit.

By setting the speed of main section movement above the first speed while defibrated material is being introduced to the sieve unit, the sheet manufacturing apparatus thus comprised can maintain the amount of defibrated material passing through the openings, and the quality of the manufactured sheet can be maintained, even if the amount of defibrated material introduced decreases before the sieve unit stops. Furthermore, by stopping the sieve unit with defibrated material stored inside the sieve unit (before all defibrated material in the sieve unit passes through the openings), the time until the apparatus stops can be shortened.

A sheet manufacturing method according to another aspect of the invention comprises: a step of introducing at least part of material defibrated in a defibration process to a sieve unit, moving a main section of the sieve unit at a first speed, and passing the defibrated material through multiple openings disposed in the main section; and a step of forming a sheet using precipitate that past through the openings of the sieve unit; the sheet manufacturing method stopping the sieve unit with defibrated material that was introduced stored inside the sieve unit.

In the sheet manufacturing method thus comprised, the time until the apparatus stops can be shortened by stopping the sieve unit with defibrated material stored inside the sieve unit. The time until sheet production starts can also be shortened because the defibrated material stored in the sieve unit passes through the openings if the apparatus is then started from this state.

DESCRIPTION OF EMBODIMENTS

Preferred embodiments of the invention are described below with reference to the accompanying figures. Note that the embodiments described below do not unduly limit the scope of the invention described in the accompanying claims. All configurations described below are also not necessarily essential elements of the invention.

1. Configuration

Figure 1:
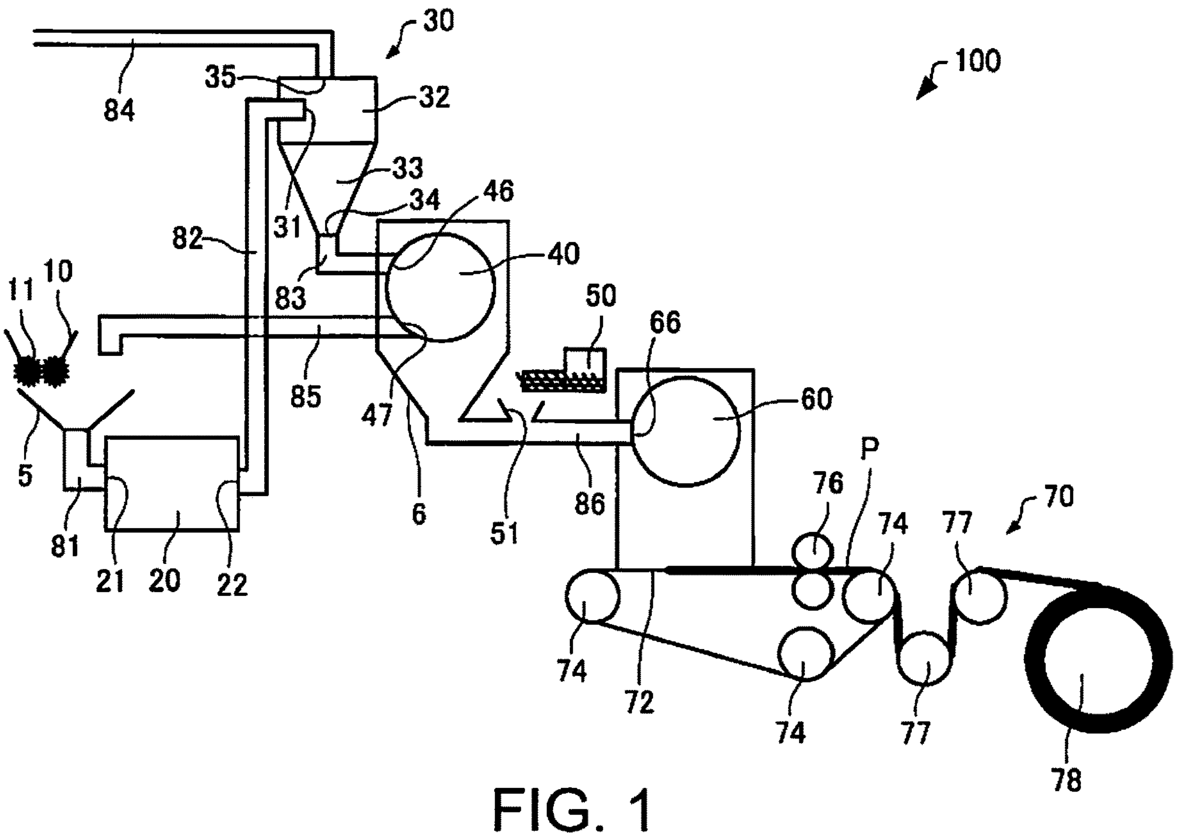
FIG. 1 schematically illustrates a sheet manufacturing apparatus according to an embodiment of the invention.

FIG. 1 schematically illustrates a sheet manufacturing apparatus 100 according to an embodiment of the invention. As shown in FIG. 1, the sheet manufacturing apparatus 100 has a supply unit 10, defibrating unit 20, classifier 30, first sieve unit 40, resin supply unit 50, second sieve unit 60, and forming unit 70.

The supply unit 10 cuts feedstock such as pulp sheet and inserted sheets (such as A4 size recovered paper) in air into small shreds and supplies the shreds to the defibrating unit 20. The shape and size of the shreds are not specifically limited, and in this example the shreds are a few centimeters square. In the example in the figure, the supply unit 10 has shredder blades 11, cuts the supplied feedstock into shreds with the rotating shredder blades 11, and supplies the shreds downstream. The supply unit 10 functions as a shredder that cuts the feedstock (material containing fiber) into shreds, and functions as a supply unit that supplies feedstock downstream, but may function only as a supply unit. Note that separate shredder and supply units may be used. The supply unit may also be configured as a sheet feeder that supplies the feedstock as whole sheets.

The shreds that are cut up by the supply unit 10 are received by a hopper 5 and conveyed therefrom through a first conveyance unit 81 to the defibrating unit 20. The first conveyance unit 81 communicates with the inlet 21 of the defibrating unit 20. The first conveyance unit 81 and the second to sixth conveyance units 82 to 86 described below are tubular in this example.

The defibrating unit 20 defibrates the shreds (undefibrated material). The defibrating unit 20 converts the shreds into fiber that is detangled into fibers in the defibration process.

The defibration process is a process of converting shreds of many bonded fibers into individual detangled fibers. Material that has past through the defibrating unit 20 is referred to as defibrated material. In addition to untangled fibers, the defibrated material may also contain resin particles (resin used to bind multiple fibers together) and ink particles such as ink, toner, and sizing agents, that are separated from the fibers when the fibers are detangled. Below, defibrated material refers to at least part of the material that past the defibrating unit 20, and may include material that is added after passing through the defibrating unit 20. Undefibrated material means material that is to be defibrated in the defibrating unit 20.

The defibrating unit 20 separates resin particles, ink, toner, sizing agents, and other and ink particles adhering to the shreds. The resin particles and ink particles are discharged with the defibrated material from the outlet 22. The defibrating unit 20 defibrates the shreds introduced from the inlet 21 by means of rotating blades. The defibrating unit 20 defibrates in a dry process in air.

The defibrating unit 20 preferably has a mechanism for producing an air current. In this configuration, the defibrating unit 20 suctions the shreds together with the air flow from the inlet 21, defibrates the material, and then conveys the defibrated material to the outlet 22 using the air flow produced by the defibrating unit 20. Defibrated material discharged from the outlet 22 is conveyed through a second conveyance unit 82 to the classifier 30. If a defibrating unit 20 without a mechanism for producing an air flow is used, a mechanism for producing an air flow that carries the shreds to the inlet 21 may be disposed externally.

The classifier 30 separates and removes resin particles and ink particles from the defibrated material. An air classifier is used as the classifier 30. An air classifier produces a helical air flow, and separates material by centrifugal force and the size and density of the material being classified, and the cut point can be adjusted by adjusting the speed of the air flow and the centrifugal force. More specifically, a cyclone, elbow-jet or eddy classifier, for example, may be used as a classifier 30. A cyclone is particularly well suited as the classifier 30 because of its simple construction. A configuration using a cyclone as the classifier 30 is described below.

The classifier 30 has at least an inlet 31, a bottom discharge port 34 disposed at the bottom, and a top discharge port 35 disposed at the top. In the classifier 30, the air flow carrying defibrated material introduced from the inlet 31 changes to a circular air flow, centrifugal force is thereby applied to defibrated material that is introduced, and the defibrated material is separated into fiber (detangled fibers) and waste (resin particles, ink particles) that are smaller and have lower density than the fiber. The fiber is then discharged from the bottom discharge port 34, passes through the third conveyance unit 83, and is carried to the inlet 46 of the first sieve unit 40. The waste passes from the top discharge port 35 through a fourth conveyance unit 84, and is discharged to the outside of the classifier 30.

Note that the classifier 30 is described as separating the fiber and waste, but this does not mean complete separation. Relatively small and low density fiber may be discharged externally with the waste. Relatively high density waste and waste that is interlocked with fiber may also be introduced with the fiber to the first sieve unit 40. Material that is discharged from the bottom discharge port 34 (material with a higher percentage of long fibers than the waste) is referred to herein as fiber or fiber material, and material that is discharged from the top discharge port 35 (material with a lower percentage of long fibers than the fiber) is referred to as waste. Note that when the feedstock is pulp sheet instead of recovered paper, there is no material equivalent to this waste, and the classifier 30 may be omitted from the configuration of the sheet manufacturing apparatus 100.

The first sieve unit 40 (an example of a sieve unit) separates the fiber that was separated by the classifier 30 (the defibrated material output from the defibrating unit 20 if the classifier 30 is omitted) into precipitate that past the first sieve unit 40, and remnants that did not pass.

Figure 2:
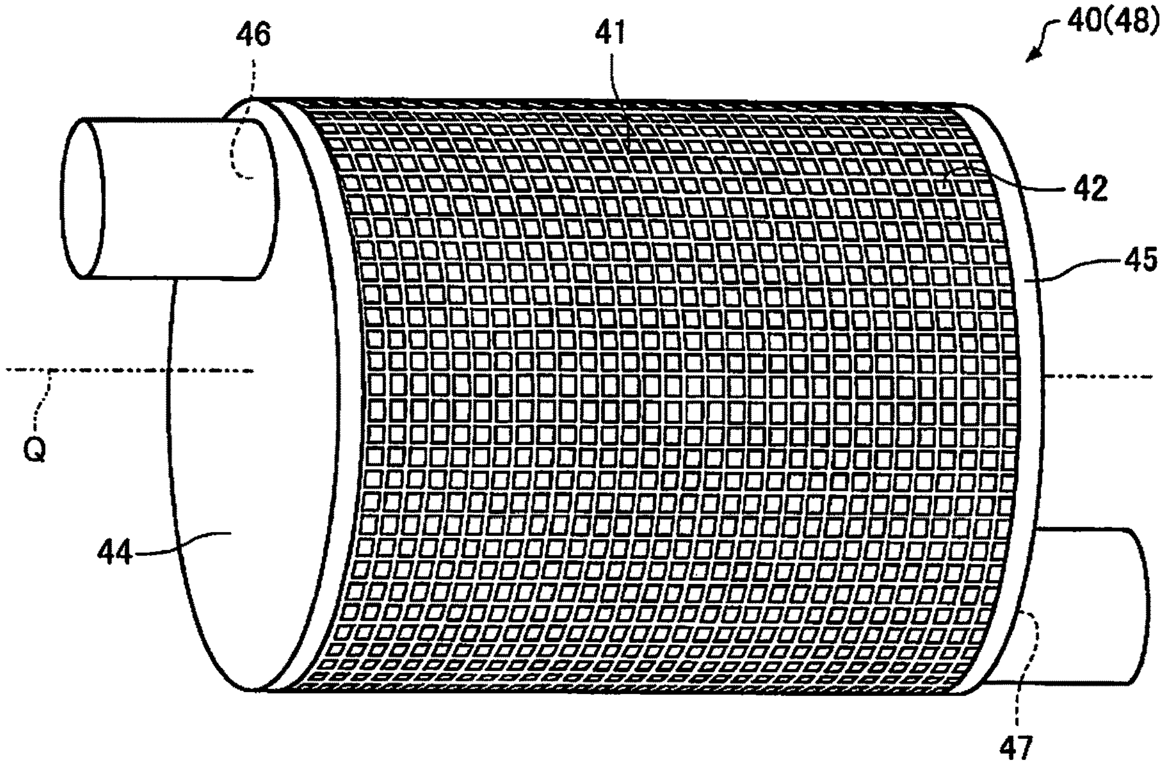
FIG. 2 is an oblique view illustrating a first sieve unit.

FIG. 2 is an oblique view illustrating the first sieve unit 40. As shown in FIG. 2, the main section 48 of the first sieve unit 40 includes a screen 41, round caps 44, 45, an inlet 46, and an outlet 47. The main section 48 is a rotary sieve configured so that the cylindrical screen 41 rotates (an example of movement) on an axis of rotation Q when driven by a motor (not shown in the figure). The screen 41 has many openings 42, and there is a hollow space inside the screen 41. When the screen 41 turns, fibers of a size that can pass through the openings 42 and are contained in the fiber introduced to the screen 41 pass through, and fibers too large to pass through the openings 42 do not pass through. More specifically, the first sieve unit 40 can select from the fiber that is introduced fibers (precipitate) that are shorter than a specific length. The screen 41 is a metal screen such as plain weave wire mesh or welded metal mesh. Note that expanded metal made by expanding a metal sheet with slits formed therein may be used, or punched metal having openings formed by a press in a metal sheet may be used, in the first sieve unit 40 instead of a screen 41 configured with metal mesh. If expanded metal is used, the openings are the openings formed by stretching the slits formed in the metal sheet. If punched metal is used, the openings are the openings formed in the metal sheet by a press, for example. A foraminous member made of a material other than metal may also be used. The main section of the first sieve unit 40 may also be configured from a foraminous flat sheet sieve (flat sieve) (screen portion) instead of a cylindrical sieve. In this configuration, the main section of the first sieve unit 40 moves in a reciprocating action (another example of movement) causing fibers to pass through the openings.

The round caps 44, 45 of the first sieve unit 40 are disposed to the two openings formed at the ends of the screen 41 when the screen 41 forms a cylinder. The inlet 46 through which fiber is introduced is disposed to one cap 44, and the outlet 47 through which waste is discharged is disposed to the other cap 45. When the first sieve unit 40 turns, the screen 41 turns, but the round caps 44, 45, inlet 46, and outlet 47 do not turn. The round caps 44, 45 contact the ends of the screen 41 so that the screen 41 can rotate. Because the round caps 44, 45 and screen 41 touch with no gap therebetween, fiber inside the screen 41 is prevented from leaking to the outside.

Waste that does not pass through the openings 42 in the first sieve unit 40 is discharged from the outlet 47, conveyed to the hopper 5 through a fifth conveyance unit 85 configured as a return channel, and returned to the defibrating unit 20. Precipitate that past the openings 42 in the first sieve unit 40 is received in a hopper 6 and conveyed therefrom through a sixth conveyance unit 86 to the inlet 66 of the second sieve unit 60. A supply port 51 for supplying resin to bind fibers (defibrated material) together is disposed to the sixth conveyance unit 86.

The resin supply unit 50 supplies resin in air from the supply port 51 to the sixth conveyance unit 86. More specifically, the resin supply unit 50 supplies resin to the path of the precipitate that past the mesh in the first sieve unit 40 from the first sieve unit 40 to the second sieve unit 60 (the path between the first sieve unit 40 and the second sieve unit 60). The configuration of the resin supply unit 50 is not specifically limited insofar as it can supply resin to the sixth conveyance unit 86, and may use a screw feeder or circle feeder, for example. Resin supplied from the resin supply unit 50 is resin for bonding fibers together. The fibers have not been bonded at the time the resin is supplied to the sixth conveyance unit 86. The resin melts and bonds fibers when passing the forming unit 70 described below. The resin may be a thermoplastic resin or thermoset resin, and may be in a fiber form or powder form. The amount of resin that is supplied from the resin supply unit 50 is set appropriately according to the type of sheet to be manufactured. Note that in addition to resin for binding fibers, a coloring agent for adding color to the fiber, or an anti-blocking agent for preventing agglomeration of fiber, may also be supplied according to the type of sheet to be manufactured. Note that the resin supply unit 50 may also be omitted in the configuration of the sheet manufacturing apparatus 100.

Resin supplied from the resin supply unit 50 is mixed with the precipitate that past the openings in the first sieve unit 40 by a mixing unit (not shown in the figure) disposed in the sixth conveyance unit 86. The mixing unit produces an air current for conveying the second sieve unit 60 while mixing the precipitate and resin.

The second sieve unit 60 (an example of a sifter) detangles tangled material. If the resin supplied from the resin supply unit 50 is in a fiber form, the second sieve unit 60 also detangles interlocked resin fibers. The second sieve unit 60 lays the precipitate and resin uniformly on the deposition unit 72 described below. In other words, "detangle" includes the action of breaking apart and the action of uniformly laying interlocked fibrous material. Note that if there are no interlocked fibers, detangling acts to deposit the fiber uniformly. The second sieve unit 60 is a rotary sieve configured so that a cylindrical screen rotates when driven by a motor (not shown in the figure). Note that the sieve of the second sieve unit 60 may be configured without functionality for selecting specific material. More specifically, the sieve of the second sieve unit 60 means a device having a foraminous screen portion, and the second sieve unit 60 may cause all of the fiber and resin introduced to the second sieve unit to be discharged through the openings to the outside. In this configuration, the size of the screen openings in the second sieve unit is greater than or equal to the size of the screen openings in the first sieve unit 40. A difference in the configurations of the second sieve unit 60 and the first sieve unit 40 is that the second sieve unit 60 does not have a discharge port (a part equivalent to the outlet 47 of the first sieve unit 90). Like the first sieve unit 40, the main section of the second sieve unit 60 may be configured from a foraminous flat sheet sieve (flat sieve) and move reciprocally. Note also that either one of the first sieve unit 40 and second sieve unit 60 may be omitted from the configuration of the sheet manufacturing apparatus 100.

While the second sieve unit 60 rotates, the mixture of precipitate (fiber) that past the first sieve unit 40 and resin is introduced from the inlet 66 to the second sieve unit 60 comprising a tubular screen. The mixture introduced to the second sieve unit 60 moves by centrifugal force to the screen. As described above, the mixture introduced to the second sieve unit 60 may contain tangled fiber and resin, and the interlocked fiber and resin is detangled in air by the rotating screen. The detangled resin and fiber then passes through the openings. The fiber and resin that past through the openings travels through air and is laid uniformly on the deposition unit 72 described below.

The fiber and resin that past through the openings in the second sieve unit 60 is deposited on the deposition unit 72 of the forming unit 70. The forming unit 70 includes the deposition unit 72, tension rollers 74, heat rollers 76, tension roller 77, and take-up roller 78. The forming unit 70 forms a sheet from the precipitate (fiber and resin) that past the second sieve unit 60.

The fiber and resin that past the openings of the second sieve unit 60 is received by and accumulates on the deposition unit 72 of the forming unit 70 as deposited material. The deposition unit 72 is located below the second sieve unit 60. The deposition unit 72 is, for example, a mesh belt. Mesh that is tensioned by tension rollers 74 is formed in the mesh belt. The deposition unit 72 moves when the tension rollers 74 rotate. A web of a uniform thickness is formed on the deposition unit 72 by the defibrated material and resin precipitating continuously from the second sieve unit 60 accumulating continuously while the deposition unit 72 moves continuously.

A suction device (not shown in the figure) that suctions the deposited material down is disposed below the deposition unit 72. The suction device is located below the second sieve unit with the deposition unit 72 therebetween, and produces a downward flow of air (air flow directed from the second sieve unit 60 to the deposition unit 72). The defibrated material and resin distributed in air can therefore be suctioned, and the discharge speed from the second sieve unit 60 can be increased. As a result, the productivity of the sheet manufacturing apparatus 100 can be increased. The suction device also creates a downward flow in the precipitation path of the defibrated material and resin, and the defibrated material and resin can be prevented from becoming tangled while precipitating.

Heat and pressure are applied by the heat rollers 76 to the defibrated material and resin laid on the deposition unit 72 of the forming unit 70 while moving with the deposition unit 72. Heat causes the resin to function as a bonding agent that binds fibers together, pressure reduces thickness, the surface is smoothed while passing between calender rollers not shown, and a sheet P is formed. In the example shown in the figures, the sheet P is wound onto a take-up roller 78. A sheet P can therefore be manufactured.

Figure 3:
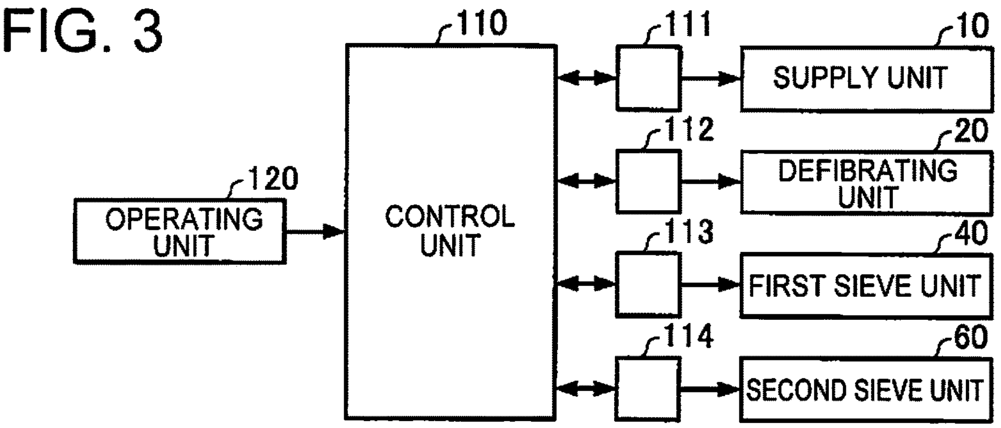
FIG. 3 is a function block diagram of a sheet manufacturing apparatus according to an embodiment of the invention.

FIG. 3 is a function block diagram of the sheet manufacturing apparatus 100. The sheet manufacturing apparatus 100 has a control unit 110 including a CPU and a storage unit (ROM, RAM), and an operating unit 120 for inputting operating information.

The control unit 110 outputs control signals to first to fourth drivers (motor drivers) 111-114. The first driver 111 controls the motor of the supply unit 10 and drives the supply unit 10 based on control signals. The second driver 112 controls the motor of the defibrating unit 20 and drives the defibrating unit 20 based on control signals. The third driver 113 controls the motor of the first sieve unit 40 and drives the first sieve unit 40 based on control signals. The fourth driver 114 controls the motor of the second sieve unit 60 and drives the second sieve unit 60 based on control signals.

When operating information instructing starting the apparatus (starting production) is received from the operating unit 120, the control unit 110 outputs control signals to the first to fourth drivers 111-114 and starts driving the motors; and when operating information instructing stopping the apparatus is received from the operating unit 120, outputs control signals to the first to fourth drivers 111-114 and stops driving the motors. The control unit 110 also outputs control signals to the third driver 113 to control the operating speed of the first sieve unit 40 (the rotational speed of the screen 41), and outputs control signals to the fourth driver 114 to control the operating speed of the second sieve unit 60 (the rotational speed of the screen portion).

2. Controlling Stopping

The process of controlling stopping the sheet manufacturing apparatus 100 according to this embodiment is described next.

When operation of the sheet manufacturing apparatus 100 according to this embodiment stops (when sheet production stops), the first sieve unit 40 and second sieve unit 60 stop with defibrated material remaining in the main sections of the first sieve unit 40 and second sieve unit 60.

2-1. Example 1

Figure 4:
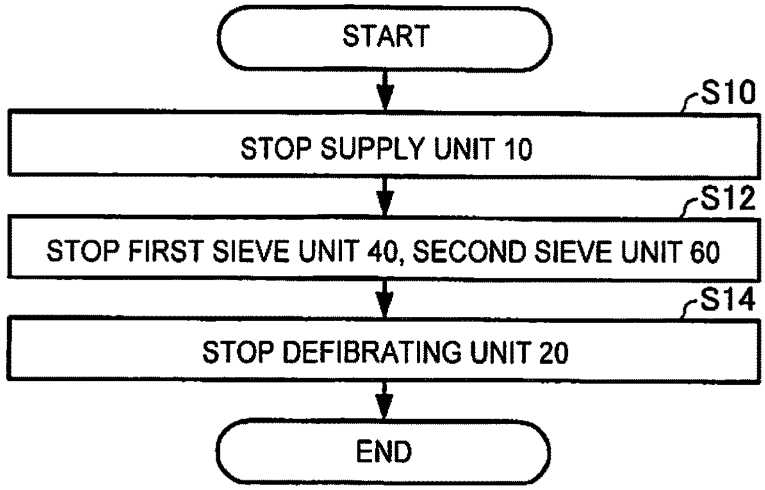
FIG. 4 is a flow chart of the process controlling stopping operation in a first example.

FIG. 4 is a flow chart of the process controlling stopping operation in a first example.

The control unit 110 first outputs a control signal to the first driver 111 to stop the supply unit 10 (step S10). Next, the control unit 110 outputs control signals to the third driver 113 and fourth driver 114 to stop rotation (an example of movement) of the first sieve unit 40 and second sieve unit 60 (step S12). Next, the control unit 110 outputs a control signal to the second driver 112 to stop the defibrating unit 20 (step S14).

Because the defibrating unit 20 is still being driven after the supply unit 10 is stopped in step S10, defibrated material (fiber) is introduced to the first sieve unit 90 from the defibrating unit 20 and the conveyance path from the defibrating unit 20. By stopping rotation of the first sieve unit 40 in step S12, discharge of defibrated material from the first sieve unit 40 stops (defibrated material stops passing through the openings in the first sieve unit 40). Defibrated material can therefore be stored inside the first sieve unit 40 by stopping rotation of the first sieve unit 90 while defibrated material is being introduced to the first sieve unit 90.

Likewise, because the defibrating unit 20 and first sieve unit 40 are still being driven even though the supply unit 10 stops in step S10, defibrated material (fiber and resin) is introduced to the second sieve unit 60 from the first sieve unit 40 and the conveyance path from the first sieve unit 40. By then stopping rotation of the second sieve unit 60 in step S12, discharge of defibrated material from the second sieve unit 60 stops (defibrated material stops passing through the openings in the second sieve unit 60). Defibrated material can therefore be stored inside the second sieve unit 60 by stopping rotation of the second sieve unit 60 while defibrated material is being introduced to the second sieve unit 60.

The time required for the apparatus to stop can therefore be shortened by stopping the first sieve unit 40 and second sieve unit 60 while defibrated material remains inside the first sieve unit 90 and second sieve unit 60. Because defibrated material is already stored inside the first sieve unit 40 and second sieve unit 60 the next time the apparatus starts operating, a sufficient amount of defibrated material can be supplied to the downstream side of the first sieve unit 40 and second sieve unit 60 as soon as the apparatus starts operating, the time required for the apparatus to start up can be shortened, and sheet quality is stable from the start of operation.

Note that in step S12 the first sieve unit 40 and second sieve unit 60 may be stopped simultaneously, the second sieve unit 60 may be stopped after stopping the first sieve unit 40, or the first sieve unit 40 may be stopped after stopping the second sieve unit 60. These can be changed as long as defibrated material is stored inside the first sieve unit 40 and second sieve unit 60.

The defibrating unit 20 is also preferably stopped in step S14 after all defibrated material inside the defibrating unit 20 has been discharged. This is because if the defibrating unit 20 is driven with material already in the defibrating unit 20 when operation starts, the load increases, starting torque may be insufficient, and the defibrating unit 20 may not be able to start. As a result, stopping the supply unit 10 in step S10 and stopping the defibrating unit 20 in step S14 are delayed a time sufficient to discharge any defibrated material inside the defibrating unit 20. The first sieve unit 40 and second sieve unit 60 may be stopped during this delay with material stored inside.

2-2. Example 2

Figure 5:
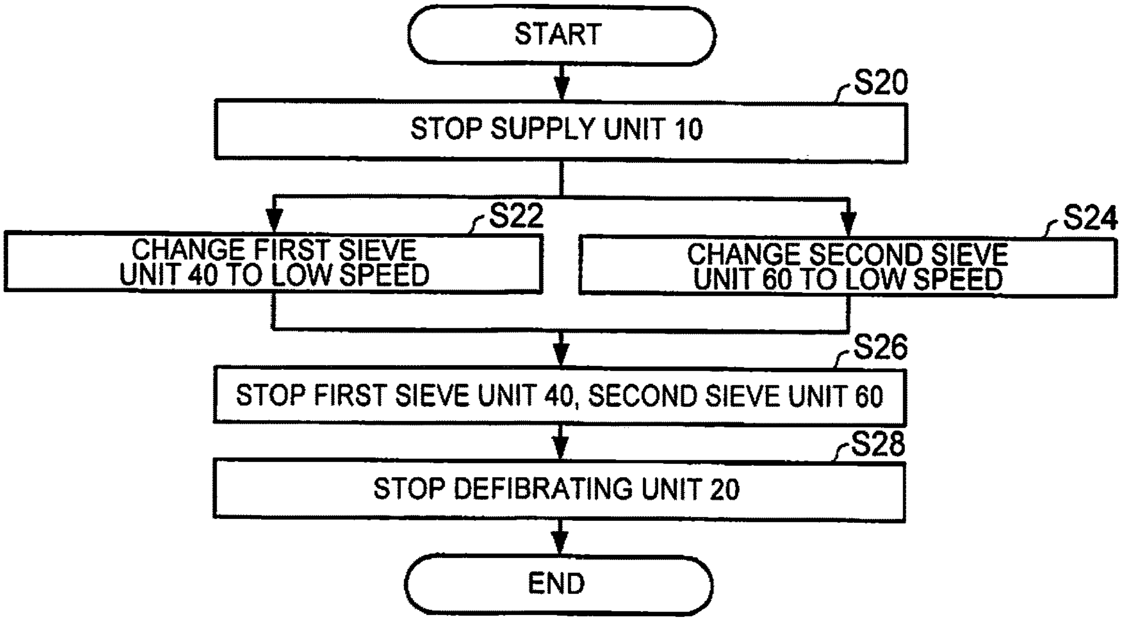
FIG. 5 is a flow chart of the process controlling stopping operation in a second example.

FIG. 5 is a flow chart of the process controlling stopping operation in a second example.

The control unit 110 first outputs a control signal to the first driver 111 to stop the supply unit 10 (step S20). Next, the control unit 110 outputs a control signal to the third driver 113 to change the rotational speed of the first sieve unit 40 to a slower speed, which is slower than the normal operating speed (first speed) (step S22), and outputs a control signal to the fourth driver 114 to change the rotational speed of the second sieve unit 60 to a slower speed than the normal operating speed (step S24). Next, the control unit 110 outputs control signals to the third driver 113 and fourth driver 114 to stop the first sieve unit 40 and second sieve unit 60 (step S26). Next, the control unit 110 outputs a control signal to the second driver 112 to stop the defibrating unit 20 (step S28).

Because the defibrating unit 20 is still being driven after the supply unit 10 is stopped in step S20, defibrated material (fiber) is introduced to the first sieve unit 40 from the defibrating unit 20 and the conveyance path from the defibrating unit 20. If the first sieve unit 40 stops turning, defibrated material fed to the first sieve unit 40 after defibrated material is stored in the first sieve unit 40 may clog the upstream side of the first sieve unit 40 or the inside of the first sieve unit 40 and possibly cause conveyance problems.

As a result, by turning the first sieve unit 40 at a lower speed than normal in step S22 in the second example, defibrated material is introduced to the first sieve unit 40 instead of clogging the upstream side, the amount discharged from the first sieve unit 40 is reduced, and defibrated material can be stored in the first sieve unit 40. Likewise, by turning the second sieve unit 60 at a lower speed than normal in step S24, defibrated material is introduced to the second sieve unit 60 instead of clogging the upstream side, the amount discharged from the second sieve unit 60 is reduced, and defibrated material can be stored in the second sieve unit 60.

By then stopping the first sieve unit 40 and second sieve unit 60 in step S26, discharge of defibrated material from the first sieve unit 40 and second sieve unit 60 stops, and defibrated material can be stored in the first sieve unit 40 and second sieve unit 60.

As in the first example, the configuration of the second example can also shorten the time required for the apparatus to stop by stopping the first sieve unit 40 and second sieve unit 60 while defibrated material remains inside the first sieve unit 40 and second sieve unit 60. In addition, the configuration of the second example can store defibrated material inside the first sieve unit 40 and second sieve unit 60 while suppressing the occurrence of conveyance problems.

Note that a configuration that drives only one of the first sieve unit 40 and second sieve unit 60 at a low speed (a configuration that omits either step S22 or S24) is also conceivable. The same concept described in the first example also applies to stopping the supply unit 10 and defibrating unit 20.

2-3. Example 3

Figure 6:
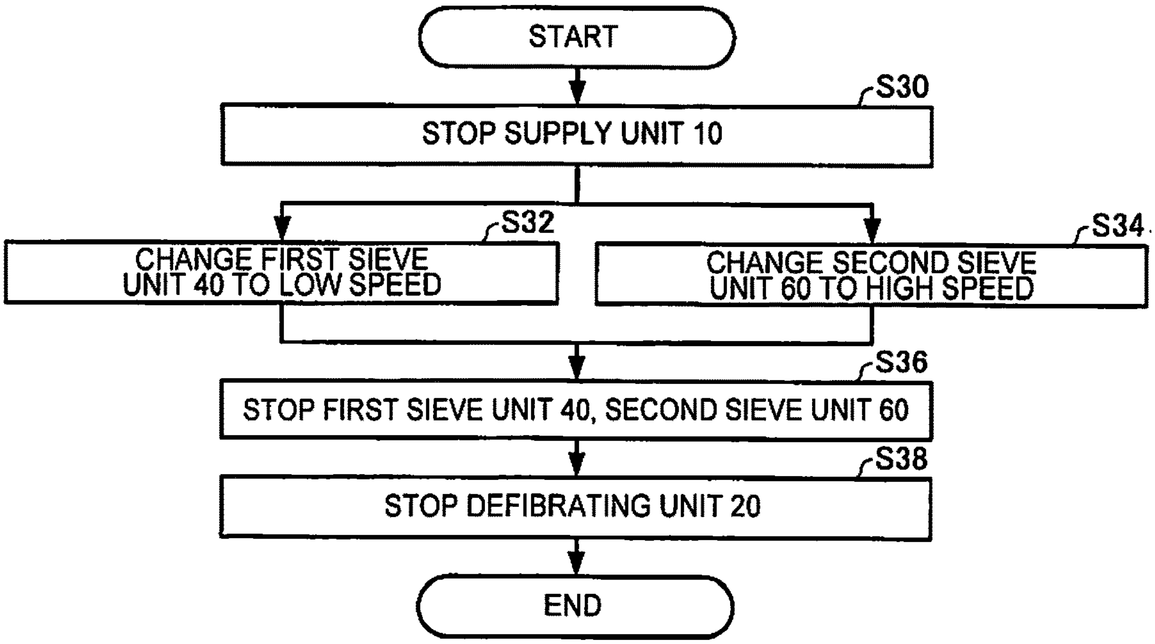
FIG. 6 is a flow chart of the process controlling stopping operation in a third example.

FIG. 6 is a flow chart of the process controlling stopping operation in a third example.

The control unit 110 first outputs a control signal to the first driver 111 to stop the supply unit 10 (step S30). Next, the control unit 110 outputs a control signal to the third driver 113 to change the rotational speed of the first sieve unit 40 to a slower speed than the normal operating speed (step S32), and outputs a control signal to the fourth driver 114 to change the rotational speed of the second sieve unit 60 to a higher speed than the normal operating speed (step S34). Next, the control unit 110 outputs control signals to the third driver 113 and fourth driver 114 to stop the first sieve unit 40 and second sieve unit 60 (step S36). Next, the control unit 110 outputs a control signal to the second driver 112 to stop the defibrating unit 20 (step S38).

The third example differs from the second example in that the second sieve unit 60 is driven at a higher speed than normal after stopping the supply unit 10. Because the amount of defibrated material introduced to the second sieve unit 60 decreases when the first sieve unit 40 is driven at a slow speed after the supply unit 10 stops, the amount of defibrated material discharged from the second sieve unit 60 also decreases and the amount of material deposited on the deposition unit 72 decreases. The amount of defibrated material discharged from the second sieve unit 60 increases as the amount of defibrated material in the second sieve unit 60 increases, and increases as the rotational speed of the second sieve unit 60 increases.

Therefore, by driving the second sieve unit 60 at a higher than normal speed in step S34 in the third example, the amount of defibrated material discharged from the second sieve unit 60 does not change even if the amount of defibrated material introduced to the second sieve unit 60 decreases. As a result, the quality (thickness) of the sheet that is made can be maintained while controlling stopping the apparatus.

Note that rotation of the second sieve unit 60 is stopped in step S36 before all defibrated material in the second sieve unit 60 is discharged. As a result, as in the first example, the time until the apparatus stops can be shortened, and the time required for the apparatus to start next can also be shortened. For example, stopping rotation of the second sieve unit 60 is timed to when the amount of defibrated material introduced to the second sieve unit 60 decreases to the point that the amount of defibrated material discharged from the second sieve unit 60 cannot be maintained even if the second sieve unit 60 turns at high speed.

2-4. Example 4

Figure 7:
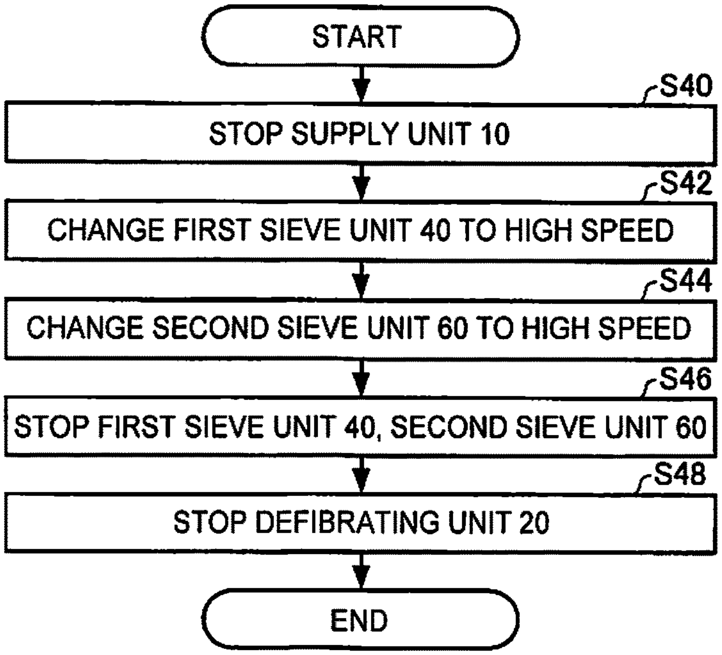
FIG. 7 is a flow chart of the process controlling stopping operation in a fourth example.

FIG. 7 is a flow chart of the process controlling stopping operation in a fourth example.

The control unit 110 first outputs a control signal to the first driver 111 to stop the supply unit 10 (step S40). Next, the control unit 110 outputs a control signal to the third driver 113 to change the rotational speed of the first sieve unit 40 to a higher speed than the normal operating speed (step S42). Next, the control unit 110 outputs a control signal to the fourth driver 114 to change the rotational speed of the second sieve unit 60 to a higher speed than the normal operating speed (step S44). Next, the control unit 110 outputs control signals to the third driver 113 and fourth driver 119 to stop the first sieve unit 90 and second sieve unit 60 (step S46). Next, the control unit 110 outputs a control signal to the second driver 112 to stop the defibrating unit 20 (step S48).

The fourth example differs from the third example in that after stopping the supply unit 10, the first sieve unit 40 is driven at a higher speed than normal, and then the second sieve unit 60 is driven at a higher speed than normal. Because the amount of defibrated material introduced to the first sieve unit 40 decreases after the supply unit 10 stops, the amount of defibrated material discharged from the first sieve unit 40 also decreases.

The first sieve unit 40 is driven at a higher than normal speed in step S42 in the fourth example so that the amount of defibrated material discharged from the first sieve unit 40 does not change. The amount of defibrated material introduced to the second sieve unit 60 is initially maintained by the first sieve unit 40 turning at high speed, but then gradually decreases because the supply unit 10 has stopped. The second sieve unit 60 is therefore driven at a higher than normal speed in step S44 in the fourth example so that the amount of defibrated material discharged from the second sieve unit 60 does not change when the amount of defibrated material introduced to the second sieve unit 60 decreases. As a result, the quality (thickness) of the sheet that is made can be maintained while controlling stopping the apparatus.

Note that rotation of the first sieve unit 90 and second sieve unit 60 stops in step S46 before all defibrated material inside the first sieve unit 90 and second sieve unit 60 has been discharged (while defibrated material remains in the first sieve unit 40 and second sieve unit 60). As a result, as in the first example, the time until the apparatus stops can be shortened, and the time required for the apparatus to start next can also be shortened.

3. Controlling Starting

The process of controlling starting the sheet manufacturing apparatus 100 according to this embodiment is described next.

3-1. Example 5

Figure 8:
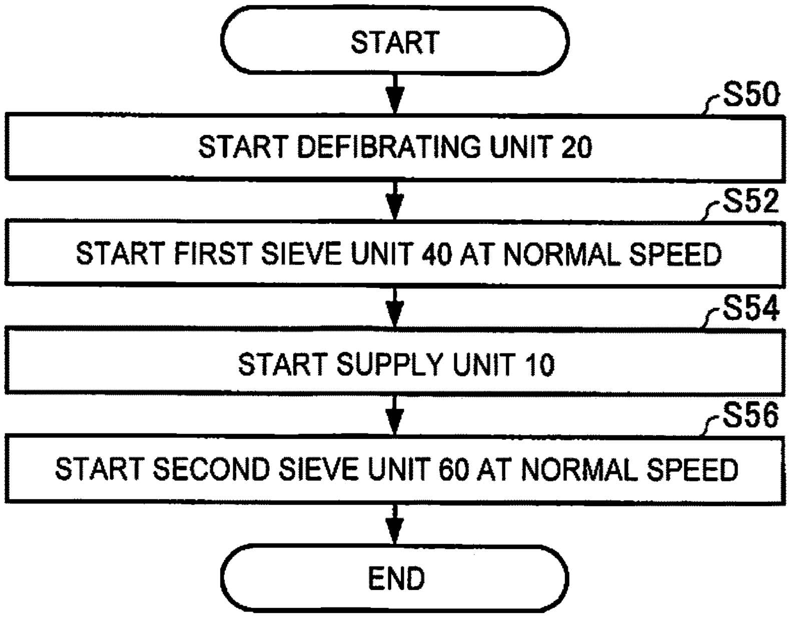
FIG. 8 is a flow chart of the process controlling starting operation in a fifth example.

FIG. 8 is a flow chart of the process controlling starting operation in a fifth example.

The control unit 110 first outputs a control signal to the second driver 112 to start the defibrating unit 20 (step S50). Next, the control unit 110 outputs a control signal to the third driver 113 to start and drive the first sieve unit 40 at the normal operating speed (step S52). Next, the control unit 110 outputs a control signal to the first driver 111 to start the supply unit 10 (step S54). Next, the control unit 110 outputs a control signal to the fourth driver 114 to start and drive the second sieve unit 60 at the normal operating speed (step S56).

Because there is no material stored in the defibrating unit 20, the defibrating unit 20 starts first. The first sieve unit 40 starts next in preparation for the introduction of defibrated material from the defibrating unit 20 to the classifier 30 and first sieve unit 40. The supply unit 10 then starts and the second sieve unit 60 starts. Some time is required after the supply unit 10 for sufficient defibrated material to be supplied downstream from the defibrating unit 20. However, as described above, the first sieve unit 40 and second sieve unit 60 are stopped with defibrated material left inside. As a result, the first sieve unit 40 and second sieve unit 60 start operating with defibrated material inside. There is therefore no need for the first sieve unit 40 and second sieve unit 60 to remain stopped until defibrated material accumulates inside. Defibrated material can therefore be supplied downstream from the first sieve unit 40 and second sieve unit 60 from the time operation starts, the time required for the apparatus to start up can be shortened, and sheet quality is stable from the start of operation. Note that because the first sieve unit 40 starts before the supply unit 10 starts, the first sieve unit 40 starts before defibrated material is introduced to the first sieve unit 40. Likewise, starting the second sieve unit 60 may start before defibrated material is introduced from the first sieve unit 40.

3-2. Example 6

Figure 9:
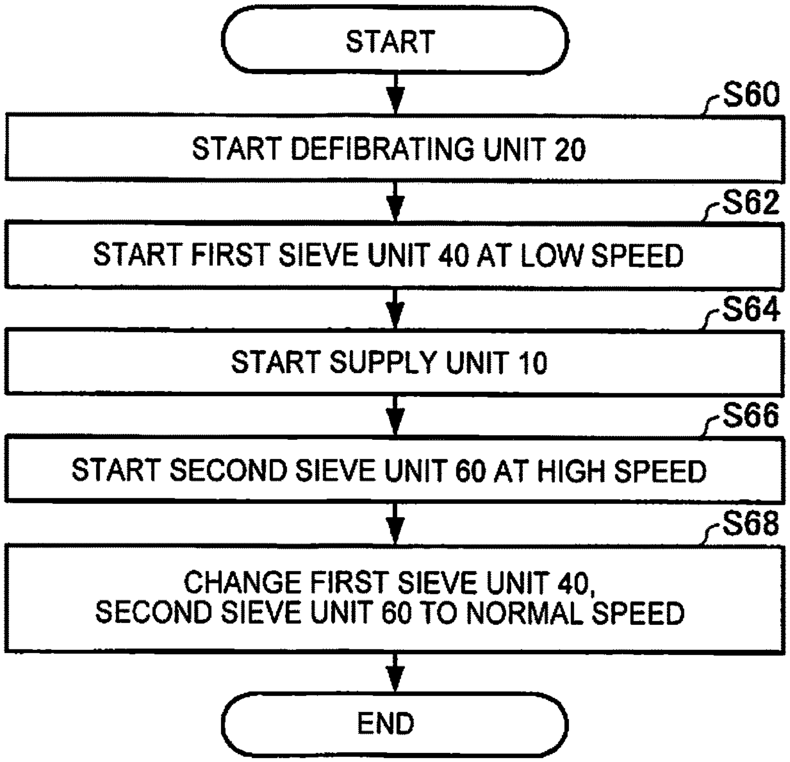
FIG. 9 is a flow chart of the process controlling starting operation in a sixth example.

FIG. 9 is a flow chart of the process controlling starting operation in a sixth example.

The control unit 110 first outputs a control signal to the second driver 112 to start the defibrating unit 20 (step S60). Next, the control unit 110 outputs a control signal to the third driver 113 to start and drive the first sieve unit 40 at the speed of low speed operation (a speed lower than the normal operating speed) (step S62). Next, the control unit 110 outputs a control signal to the first driver 111 to start the supply unit 10 step S64). Next, the control unit 110 outputs a control signal to the fourth driver 114 to start and drive the second sieve unit 60 at the speed of high speed operation (a higher speed than the normal operating speed) (step S66). Next, the supply unit 10 outputs control signals to the third driver 113 and fourth driver 114 to change the rotational speed of the first sieve unit 40 and second sieve unit 60 to the normal operating speed (step S68).

Example 6 differs from example 5 in starting the first sieve unit 40 at the speed of low speed operation and starting the second sieve unit 60 at the speed of high speed operation. Because the amount of defibrated material introduced to the second sieve unit 60 is low until sufficient defibrated material is supplied downstream from the defibrating unit 20, the second sieve unit 60 is started at a high speed so that the amount of defibrated material discharged from the second sieve unit 60 does not change. Furthermore, because the amount of defibrated material in the second sieve unit 60 decreases suddenly due to high speed operation, the first sieve unit 90 starts at low speed, defibrated material from the upstream side accumulates in the first sieve unit 40, and defibrated material can be supplied from the first sieve unit 40 to the second sieve unit 60 about the time the supply of defibrated material in the second sieve unit 60 is depleted. The first sieve unit 40 and second sieve unit 60 then change to normal operation when sufficient defibrated material is supplied downstream from the defibrating unit 20. Defibrated material can therefore be supplied downstream from the second sieve unit 60 from the time operation starts, the time required for the apparatus to start up can be shortened, and sheet quality is stable from the start of operation.

3-3. Example 7

Figure 10:
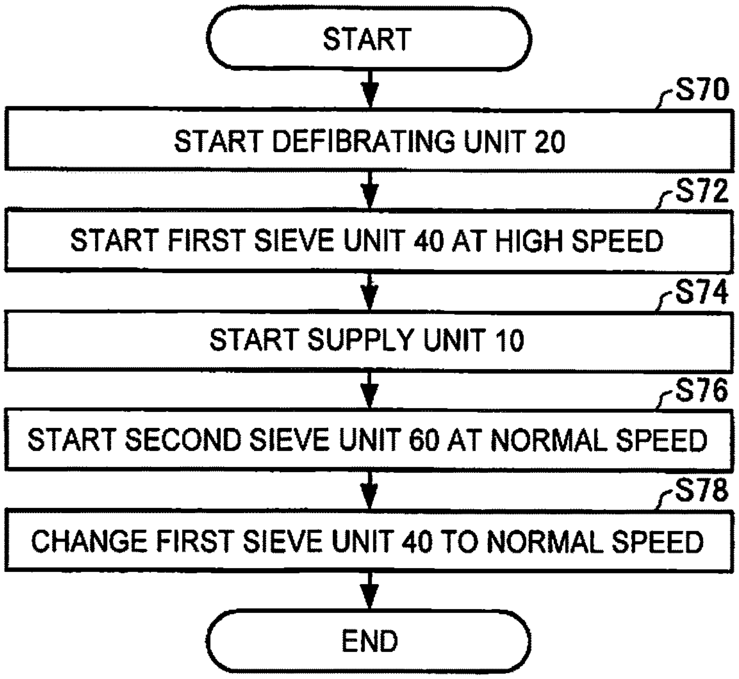
FIG. 10 is a flow chart of the process controlling starting operation in a seventh example.

FIG. 10 is a flow chart of the process controlling starting operation in a seventh example.

The control unit 110 first outputs a control signal to the second driver 112 to start the defibrating unit 20 (step S70). Next, the control unit 110 outputs a control signal to the third driver 113 to start and drive the first sieve unit 40 at the speed of high speed operation (a speed higher than the normal operating speed) (step S72). Next, the control unit 110 outputs a control signal to the first driver 111 to start the supply unit 10 (step S74). Next, the control unit 110 outputs a control signal to the fourth driver 114 to start and drive the second sieve unit 60 at the normal speed of operation (step S76). Next, the supply unit 10 outputs a control signal to the third driver 113 to change the rotational speed of the first sieve unit 40 to the normal operating speed (step 378).

Example 7 differs from example 5 in starting the first sieve unit 40 at the speed of high speed operation. Because the amount of defibrated material introduced to the first sieve unit 40 is low until sufficient defibrated material is supplied downstream from the defibrating unit 20, the first sieve unit 40 is started at a high speed so that the amount of defibrated material discharged from the first sieve unit 40 does not change. The first sieve unit 40 is then changed to normal operation when a sufficient amount of defibrated material is supplied downstream from the defibrating unit 20. As a result, defibrated material can be supplied downstream from the first sieve unit 40 and second sieve unit 60 from the time operation starts, the time required for the apparatus to start up can be shortened, and sheet quality is stable from the start of operation.

3-4. Example 8

Figure 11:
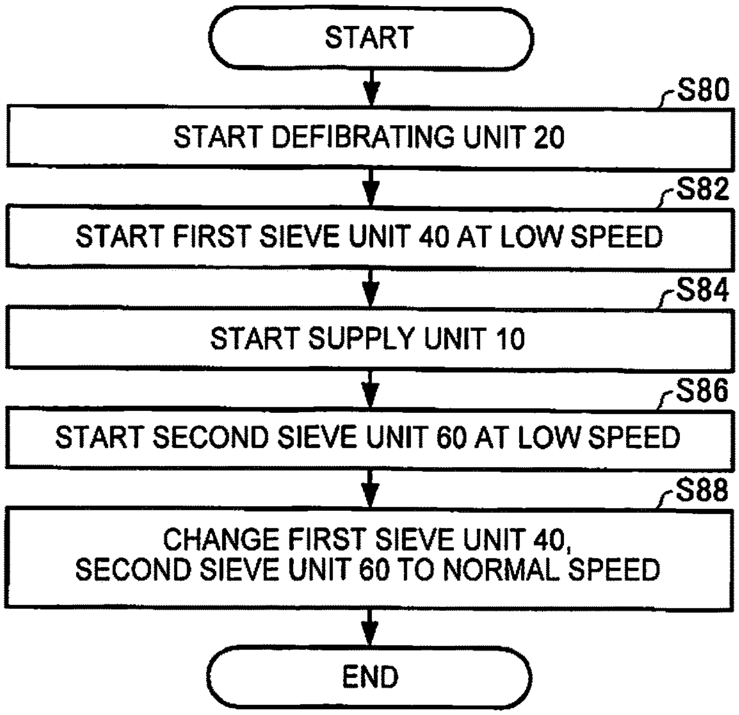
FIG. 11 is a flow chart of the process controlling starting operation in an eighth example.

FIG. 11 is a flow chart of the process controlling starting operation in an eighth example.

The control unit 110 first outputs a control signal to the second driver 112 to start the defibrating unit 20 (step S80). Next, the control unit 110 outputs a control signal to the third driver 113 to start and drive the first sieve unit 40 at the speed of low speed operation (a speed lower than the normal operating speed) (step S82). Next, the control unit 110 outputs a control signal to the first driver 111 to start the supply unit 10 (step S84). Next, the control unit 110 outputs a control signal to the fourth driver 114 to start and drive the second sieve unit 60 at the speed of low speed operation (step S86). Next, the supply unit 10 outputs control signals to the third driver 113 and fourth driver 114 to change the rotational speed of the first sieve unit 40 and second sieve unit 60 to the normal operating speed (step S88).

Example 8 differs from example 5 in starting the first sieve unit 40 and second sieve unit 60 at the speed of low speed operation. Because some time is required until sufficient defibrated material is supplied downstream from the defibrating unit 20, starting the first sieve unit 40 and second sieve unit 60 at a low speed allows defibrated material from the upstream side to accumulate in the first sieve unit 40 and second sieve unit 60, and when a sufficient amount of defibrated material is supplied from the defibrating unit 20, the first sieve unit 40 and second sieve unit 60 are changed to normal operation. As a result, a sufficient amount of defibrated material can be discharged from the second sieve unit 60 and the quality of the sheet is stable immediately after the second sieve unit 60 changes to normal operation.

Note that at least one of the first sieve unit 40 and second sieve unit 60 may remain stopped in step S82, S86 instead of starting the first sieve unit 40 and second sieve unit 60 at low speed (at least one of step S82 and S86 may be omitted).

4. Variations

The invention includes configurations that are effectively the same as the configurations described above (configurations of the same function, method, and result, or configurations of the same objective and effect). The invention also includes configurations that replace parts that are snot essential to the configuration described in the foregoing embodiment. Furthermore, the invention includes configurations having the same operating effect, or configurations that can achieve the same objective, as configurations described in the foregoing embodiment. Furthermore, the invention includes configurations that add technology known from the literature to configurations described in the foregoing embodiment.

Sheets manufactured by this sheet manufacturing apparatus 100 point primarily to products in the form of a sheet. The invention is not limited to making sheets, however, and may make paperboard and web forms. Sheets as referred to herein are separated into paper and nonwoven cloth. Paper includes products formed into thin sheets from pulp or recovered paper as the feedstock, and includes recording paper for handwriting and printing, wall paper, packaging paper, color paper, drawing paper, and Bristol paper, for example. Nonwoven cloth includes products that are thicker or have lower strength than paper, and includes common nonwoven cloth, fiberboard, tissue paper, kitchen paper, cleaning paper, filter paper, liquid absorption materials, sound absorbers, cushioning materials, and mats, for example. The feedstock may also be cellulose or other type of plant fiber, synthetic fiber such as PET (polyethylene terephthalate) and polyester, or wool, silk, or other animal fiber.

A water mister for adding moisture to the material deposited on the deposition unit 72 may also be provided. This enables increasing the strength of hydrogen bonds when forming a sheet P. Moisture is added to the deposited material by misting before passing through the heat rollers 76. Starch or PVA (polyvinyl alcohol), for example, may be added to the moisture that is misted by the water mister. This can further increase the strength of the sheet P.

The sheet P is wound onto a take-up roller 78 in the example described above, but the sheet P may be cut into sheets of a desirable size by a cutter not shown and then stacked in a stacker.

The function of a shredder may also be omitted from the supply unit 10 in the sheet manufacturing apparatus 100. For example, the shredder function is not needed if material that has shredded by an existing shredder is used as the feedstock.

The fifth conveyance unit 85 used as a return path may also be omitted. Remnants may be recovered and disposed of instead of being returned to the defibrating unit 20. The fifth conveyance unit 85 is also not needed if the performance of the defibrating unit 20 produces no remnants.

REFERENCE SIGNS LIST

10 supply unit
11 shredder blades
5 hopper
6 hopper
20 defibrating unit
21 inlet
22 outlet
30 classifier
31 inlet
34 bottom discharge port
35 top discharge port
40 first sieve unit
41 screen

42 openings
44 cap
45 cap
46 inlet
47 outlet
48 main section
50 resin supply unit
51 supply port
60 second sieve unit
66 inlet
70 forming unit
72 deposition unit
74 tension rollers
76 heat rollers
77 tension roller
78 take-up roller
81 first conveyance unit
82 second conveyance unit
83 third conveyance unit
84 fourth conveyance unit
85 fifth conveyance unit
86 sixth conveyance unit
100 sheet manufacturing apparatus
110 control unit
111 first driver
112 second driver
113 third driver
114 fourth driver
120 operating unit

The invention claimed is:

1. A sheet manufacturing apparatus comprising:

a sieve unit which has at least part of material defibrated in a defibration process introduced thereto, and includes a plurality of openings through which the defibrated material passes and which are disposed in the main section of the sieve unit;

a belt on which precipitate that has passed through the openings of the sieve unit is deposited to form a sheet;

a defibrator that performs the defibration process to defibrate the material and is arranged upstream relative to the sieve unit in a conveyance direction of the material; and a control unit including a CPU and a memory, and configured to control the sieve unit and the belt, the control unit being configured to move the sieve unit at a first speed, wherein the control unit receives from the memory an instruction on stop of manufacturing the sheet at the sheet manufacturing apparatus, and based on the instruction, controls the sieve unit to stop movement of the sieve unit with defibrated material that was introduced stored inside the sieve unit and the defibrator to stop defibration of the material after controlling the sieve unit to stop the movement of the sieve unit.

2. The sheet manufacturing apparatus according to claim 1, wherein the control unit stops the movement of the main section based on the instruction while the defibrated material is being introduced to the sieve unit and is stored in the sieve unit.

3. The sheet manufacturing apparatus according to claim 1, wherein before controlling the sieve unit to stop the movement of the sieve unit based on the instruction, the control unit moves the main section at a lower speed than the first speed while the defibrated material is being introduced to the sieve unit, such that the defibrated material is stored in the sieve unit.

4. The sheet manufacturing apparatus according to claim 2, wherein before controlling the sieve unit to stop the movement of the sieve unit based on the instruction, the control unit moves the main section at a higher speed than the first speed while the defibrated material is being introduced to the sieve unit, and the control unit controls the sieve unit to stop the movement of the main section while the defibrated material is stored in the sieve unit.

* * * * *